(12) United States Patent
DeKeuster et al.

(10) Patent No.: US 9,887,409 B2
(45) Date of Patent: Feb. 6, 2018

(54) BATTERY MODULE BUS BAR CONNECTION ASSEMBLY

(71) Applicant: Johnson Controls Technology Company, Holland, MI (US)

(72) Inventors: Richard M. DeKeuster, Racine, WI (US); Robert J. Mack, Milwaukee, WI (US)

(73) Assignee: Johnson Controls Technology Company, Holland, MI (US)

(*) Notice: Subject to any disclaimer, the term of this patent is extended or adjusted under 35 U.S.C. 154(b) by 78 days.

(21) Appl. No.: 14/502,485

(22) Filed: Sep. 30, 2014

(65) Prior Publication Data

US 2016/0093863 A1    Mar. 31, 2016

(51) Int. Cl.
*H01M 2/20*    (2006.01)
*H01M 2/30*    (2006.01)
*H01M 10/0525*    (2010.01)

(52) U.S. Cl.
CPC ............. *H01M 2/206* (2013.01); *H01M 2/20* (2013.01); *H01M 2/30* (2013.01); *H01M 2/305* (2013.01); *H01M 10/0525* (2013.01); *H01M 2220/20* (2013.01)

(58) Field of Classification Search
None
See application file for complete search history.

(56) References Cited

U.S. PATENT DOCUMENTS

| | | |
|---|---|---|
| 5,143,804 A | 9/1992 | McArthur et al. |
| 6,399,238 B1 | 6/2002 | Oweis et al. |
| 7,074,095 B2 * | 7/2006 | Perng ............... H01R 11/281 439/766 |
| 7,489,105 B2 | 2/2009 | Weinstein et al. |
| 7,798,833 B2 | 9/2010 | Holbrook |
| 7,871,719 B2 | 1/2011 | Houchin-Miller et al. |
| 8,114,540 B2 | 2/2012 | Trester et al. |

(Continued)

FOREIGN PATENT DOCUMENTS

| | | |
|---|---|---|
| JP | 2010061961 | 3/2010 |
| WO | 2014073808 A1 | 5/2014 |

OTHER PUBLICATIONS

PCT/US2015/036988 International Search Report and Written Opinion dated Sep. 24, 2015.

*Primary Examiner* — Ula C Ruddock
*Assistant Examiner* — Tony Chuo
(74) *Attorney, Agent, or Firm* — Fletcher Yoder, P.C.

(57) ABSTRACT

The present disclosure includes a battery module having a first electrochemical cell with a first terminal and a second electrochemical cell having a second terminal. The battery module also includes a bus bar connection electrically connecting the first and second electrochemical cells. The bus bar connection includes a first adapter covering at least a portion of the first terminal of the first electrochemical cell, where the first adapter includes a first recess positioned proximate to the first terminal, and a second adapter covering at least a portion of the second terminal of the second electrochemical cell, where the second adapter includes a second recess positioned proximate to and at least partially aligned with the first recess. Further, the bus bar connection includes a bus bar that spans between the first recess of the first adapter and the second recess of the second adapter to create an electrical path.

27 Claims, 7 Drawing Sheets

(56) References Cited

U.S. PATENT DOCUMENTS

| | | |
|---|---|---|
| 8,235,732 B2 | 8/2012 | Garascia et al. |
| 8,313,855 B2 | 11/2012 | Muis |
| 8,399,128 B2 | 3/2013 | Kim et al. |
| 8,580,423 B2 | 11/2013 | Kim |
| 8,684,758 B2 | 4/2014 | Gharabegian et al. |
| 2006/0094289 A1* | 5/2006 | Kim .................... H01R 11/288 439/500 |
| 2009/0075163 A1 | 3/2009 | Shevock et al. |
| 2011/0081572 A1* | 4/2011 | Byun ...................... H01M 2/26 429/178 |
| 2011/0092111 A1* | 4/2011 | Tsuchiya ............... H01M 2/202 439/765 |
| 2011/0117420 A1* | 5/2011 | Kim .................... B23K 9/0026 429/158 |
| 2012/0114991 A1* | 5/2012 | Park ................... H01M 2/1077 429/82 |
| 2012/0121966 A1 | 5/2012 | Kim |
| 2012/0237817 A1* | 9/2012 | Kim ....................... H01M 2/26 429/158 |
| 2012/0288744 A1 | 11/2012 | Guen |
| 2013/0164595 A1 | 6/2013 | Takase et al. |

\* cited by examiner

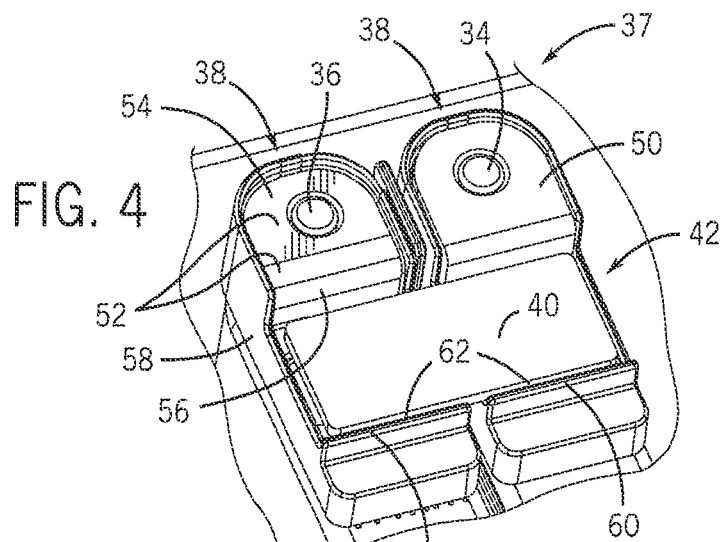
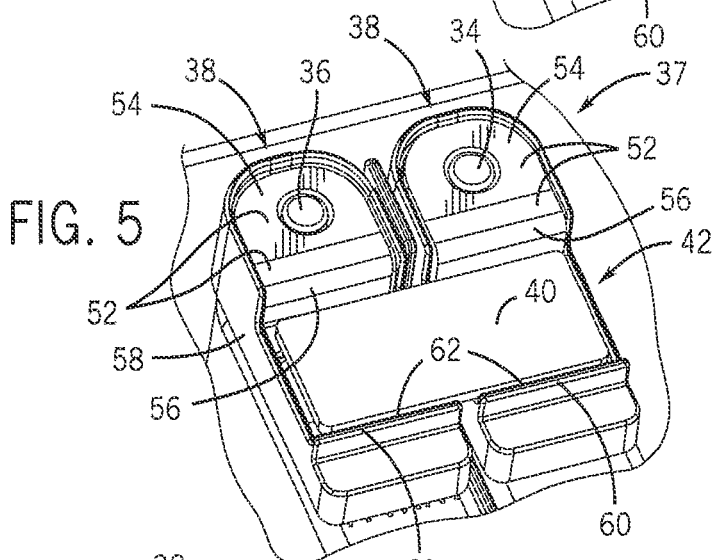
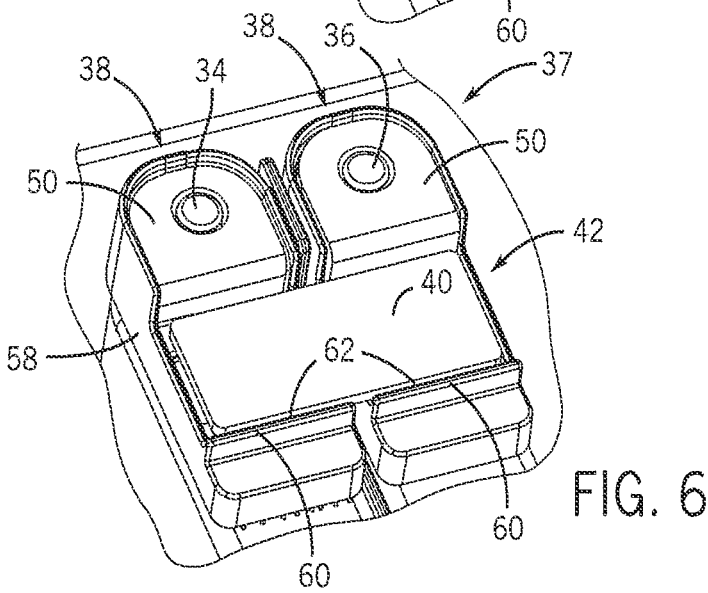

BATTERY MODULE BUS BAR CONNECTION ASSEMBLY

BACKGROUND

The present disclosure relates generally to the field of batteries and battery modules. More specifically, the present disclosure relates to a bus bar connection assembly for Lithium-ion (Li-ion) battery modules.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

A vehicle that uses one or more battery systems for providing all or a portion of the motive power for the vehicle can be referred to as an xEV, where the term "xEV" is defined herein to include all of the following vehicles, or any variations or combinations thereof, that use electric power for all or a portion of their vehicular motive force. For example, xEVs include electric vehicles (EVs) that utilize electric power for all motive force. As will be appreciated by those skilled in the art, hybrid electric vehicles (HEVs), also considered xEVs, combine an internal combustion engine propulsion system and a battery-powered electric propulsion system, such as 48 Volt (V) or 130V systems. The term HEV may include any variation of a hybrid electric vehicle. For example, full hybrid systems (FHEVs) may provide motive and other electrical power to the vehicle using one or more electric motors, using only an internal combustion engine, or using both. In contrast, mild hybrid systems (MHEVs) disable the internal combustion engine when the vehicle is idling and utilize a battery system to continue powering the air conditioning unit, radio, or other electronics, as well as to restart the engine when propulsion is desired. The mild hybrid system may also apply some level of power assist, during acceleration for example, to supplement the internal combustion engine. Mild hybrids are typically 96V to 130V and recover braking energy through a belt or crank integrated starter generator. Further, a micro-hybrid electric vehicle (mHEV) also uses a "Stop-Start" system similar to the mild hybrids, but the micro-hybrid systems of a mHEV may or may not supply power assist to the internal combustion engine and operates at a voltage below 60V. For the purposes of the present discussion, it should be noted that mHEVs typically do not technically use electric power provided directly to the crankshaft or transmission for any portion of the motive force of the vehicle, but an mHEV may still be considered as an xEV since it does use electric power to supplement a vehicle's power needs when the vehicle is idling with internal combustion engine disabled and recovers braking energy through an integrated starter generator. In addition, a plug-in electric vehicle (PEV) is any vehicle that can be charged from an external source of electricity, such as wall sockets, and the energy stored in the rechargeable battery packs drives or contributes to drive the wheels. PEVs are a subcategory of EVs that include all-electric or battery electric vehicles (BEVs), plug-in hybrid electric vehicles (PHEVs), and electric vehicle conversions of hybrid electric vehicles and conventional internal combustion engine vehicles.

xEVs as described above may provide a number of advantages as compared to more traditional gas-powered vehicles using only internal combustion engines and traditional electrical systems, which are typically 12V systems powered by a lead acid battery. For example, xEVs may produce fewer undesirable emission products and may exhibit greater fuel efficiency as compared to traditional internal combustion vehicles and, in some cases, such xEVs may eliminate the use of gasoline entirely, as is the case of certain types of EVs or PEVs.

As technology continues to evolve, there is a need to provide improved power sources, particularly battery modules, for such vehicles. For example, in traditional configurations, battery modules often include bulky, and sometimes exposed, electrical connections between terminals of electrochemical cells. The bulky and/or exposed connections may increase a volume of the battery module due (thereby reducing an energy density of the battery module), may complicate manufacturing of the battery module, and may expose the battery module to potential short circuits. Also, it is often difficult to make electrical connections between electrochemical cells of traditional battery modules because the electrochemical cells may have slightly different sizes. This may reduce manufacturing efficiency as well as energy density of the battery module.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure relates to a battery module having a first electrochemical cell with a first terminal and a second electrochemical cell having a second terminal. The battery module also includes a bus bar connection electrically connecting the first and second electrochemical cells. The bus bar connection includes a first adapter covering at least a portion of the first terminal of the first electrochemical cell, where the first adapter includes a first recess positioned proximate to the first terminal, and a second adapter covering at least a portion of the second terminal of the second electrochemical cell, where the second adapter includes a second recess positioned proximate to and at least partially aligned with the first recess. Further, the bus bar connection includes a bus bar that spans between the first recess of the first adapter and the second recess of the second adapter to create an electrical path.

The present disclosure also relates to a battery module having prismatic electrochemical cells electrically coupled to form an aggregate electrical network between a positive external terminal of the battery module and a negative external terminal of the battery module configured to be coupled to a load, where adjacent prismatic electrochemical cells are electrically coupled via respective bus bar connection assemblies to form the aggregate electrical network. Each bus bar connection assembly bus bar connection assembly includes a first adapter having a first opening that receives a first terminal of a first prismatic electrochemical cell, where the first adapter includes a first recess on a first external portion of the first adapter and disposed adjacent to the first opening. The bus bar connection assembly also includes a second adapter having a second opening that receives a second terminal of a second prismatic electrochemical cell, where the second adapter includes a second recess on a second external portion of the second adapter and disposed adjacent to the second opening. Further, the bus bar connection assembly includes a bus bar spanning between the first recess of the first adapter and the second recess of the second adapter, where a top surface of the bus bar is disposed no higher than top surfaces of the first and second terminals.

The present disclosure also relates to a system having an adapter configured to electrically couple an electrochemical cell to an adjacent electrochemical cell. The adapter includes a first bottom portion sized and shaped to fit over a terminal of the electrochemical cell, where the first bottom portion includes an opening through which the terminal of the electrochemical cell extends. The adapter also includes a second top portion having a recess that is recessed into the top portion, where the recess is sized and shaped to receive a bus bar that spans between the recess and an adjacent recess of an adjacent adapter of the adjacent electrochemical cell.

DRAWINGS

Various aspects of this disclosure may be better understood upon reading the following detailed description and upon reference to the drawings in which:

FIG. 4 is a top perspective view of a portion of the bus bar connection assembly of FIG. 3, in accordance with an aspect of the present disclosure;

FIG. 5 is a top perspective view of a portion of the bus bar connection assembly of FIG. 3, in accordance with an aspect of the present disclosure;

FIG. 6 is a top perspective view of a portion of the bus bar connection assembly of FIG. 3, in accordance with an aspect of the present disclosure;

Figure 10:
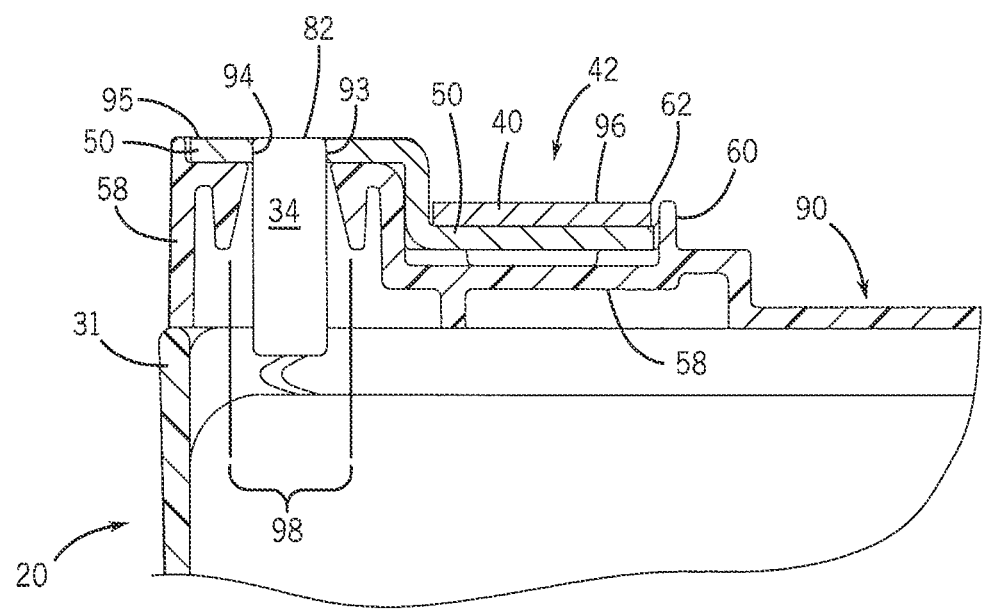
Figure 11:
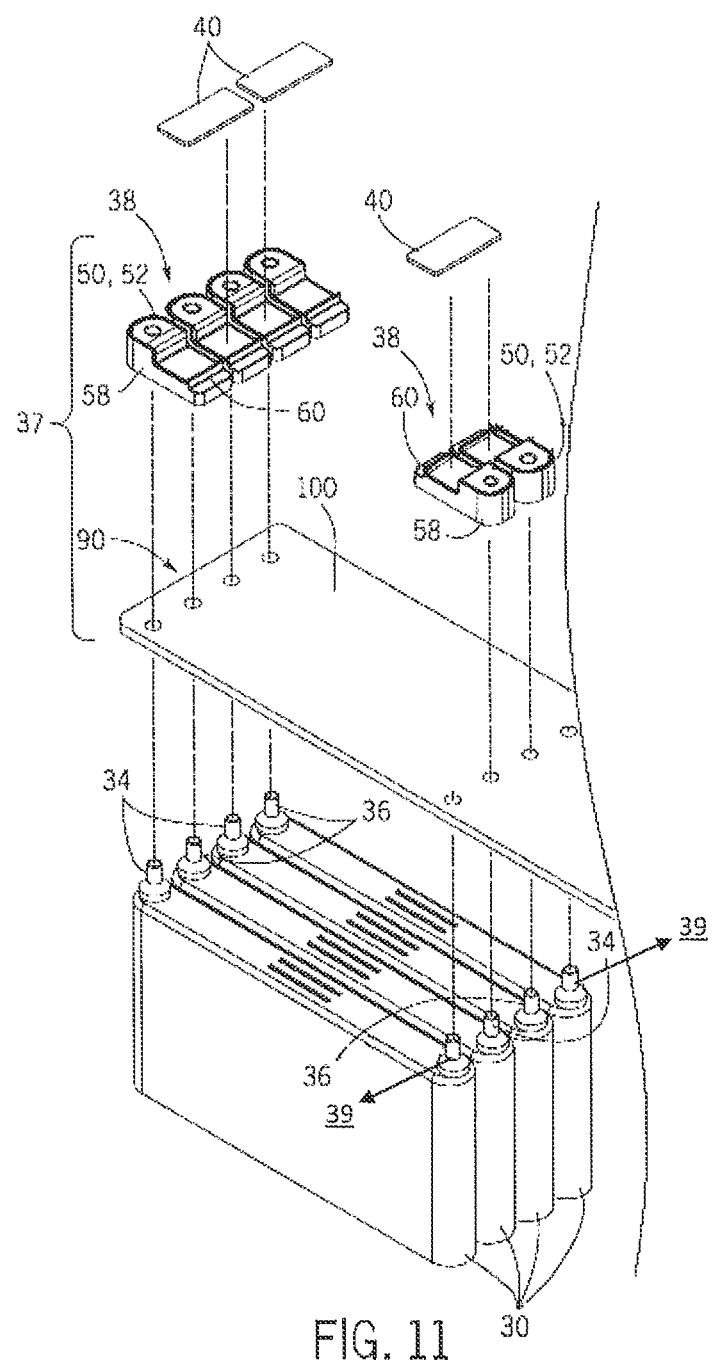
Figure 12:
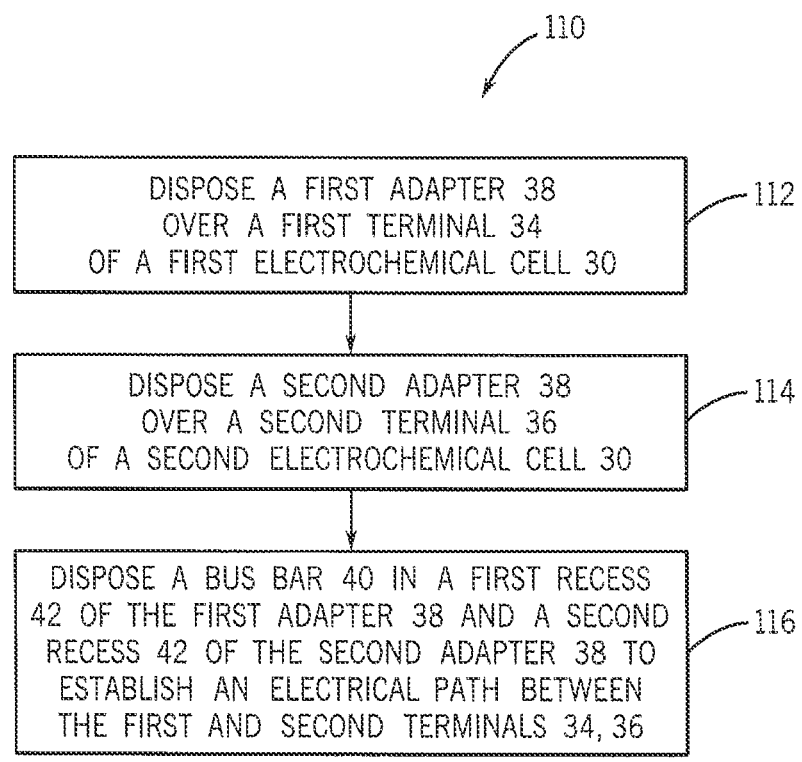

FIG. 10 is a cross-sectional side view of a battery module, e-carrier, and bus bar connection assembly, in accordance with an aspect of the present disclosure; and FIG. 11 is a side perspective view of a portion of a battery module having an e-carrier and a bus bar connection assembly, in accordance with an aspect of the present disclosure; and FIG. 12 is a process flow diagram of a method of establishing an electrical connection or path between terminals of two electrochemical cells, in accordance with an aspect of the present disclosure.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The battery systems described herein may be used to provide power to various types of electric vehicles (xEVs) and other high voltage energy storage/expending applications (e.g., electrical grid power storage systems). Such battery systems may include one or more battery modules, each battery module having a number of battery cells (e.g., Lithium-ion (Li-ion) electrochemical cells) arranged to provide particular voltages and/or currents useful to power, for example, one or more components of an xEV. As another example, battery modules in accordance with present embodiments may be incorporated with or provide power to stationary power systems (e.g., non-automotive systems).

The individual electrochemical cells may be positioned in a housing of the battery module, and terminals of the electrochemical cells may extend generally away from the housing. To couple the electrochemical cells together (e.g., in series or parallel), an electrical path between terminals of two or more electrochemical cells may be established by coupling the terminals via a bus bar. As set forth above, coupling the terminals may be difficult when the cells are different sizes (e.g., within a manufacturing tolerance). To address this and other issues, in accordance with present embodiments, adapters with metallic portions may be placed over adjacent terminals of two electrochemical cells. The adapters, in a general sense, increase a surface area of the cells available for electrical interconnections, thereby facilitating manufacture of the battery module. The adapters may each include a recess (e.g., recessed downwardly from a top surface of the adapter) configured be aligned with an adjacent adapter's recess and to receive a bus bar. The bus bar may be disposed within the aligned recesses of the two adapters, such that the bus bar spans between the two adapters and contacts the metallic portions of the adjacent adapters, which each contact the terminal over which each respective adapter is disposed. Accordingly, an electrical path is established from a first terminal, to a first adapter disposed around or over the first terminal, to the bus bar, to a second adapter disposed around or over a second terminal, and to the second terminal.

By positioning the bus bar within the recesses of the two adapters to establish the electrical path between the two adapters (and, thus, the two terminals of which the two adapters are disposed around), the bus bar is located in plane with the terminal or below top surfaces of the two terminals. This positioning of the bus bar may reduce a clearance (e.g., a height) of the battery module as a whole, thereby reducing the volume and increasing the energy density of the battery module. For example, traditional configurations may include a bus bar above the terminals, which increases a total volume of the traditional configuration, thereby decreasing energy density of the traditional configuration. Further, by positioning the bus bar within the recesses, and disposing plastic portions around the metallic portions of the adapters (particularly proximate the recesses of the adapters), the bus bar and the metallic portions of the adapters are protected from contact with other components (e.g., metal components) of, or proximate to, the battery module, thereby reducing a risk of a short circuit. Further still, in accordance with the description below, the adapters may include openings through which the terminals extend, in which the openings may be tapered from a bottom surface of the adapters (which receive the terminals) upwardly, to accommodate dimensional tolerances associated with the position of the terminals extending from the electrochemical cells.

Figure 1:
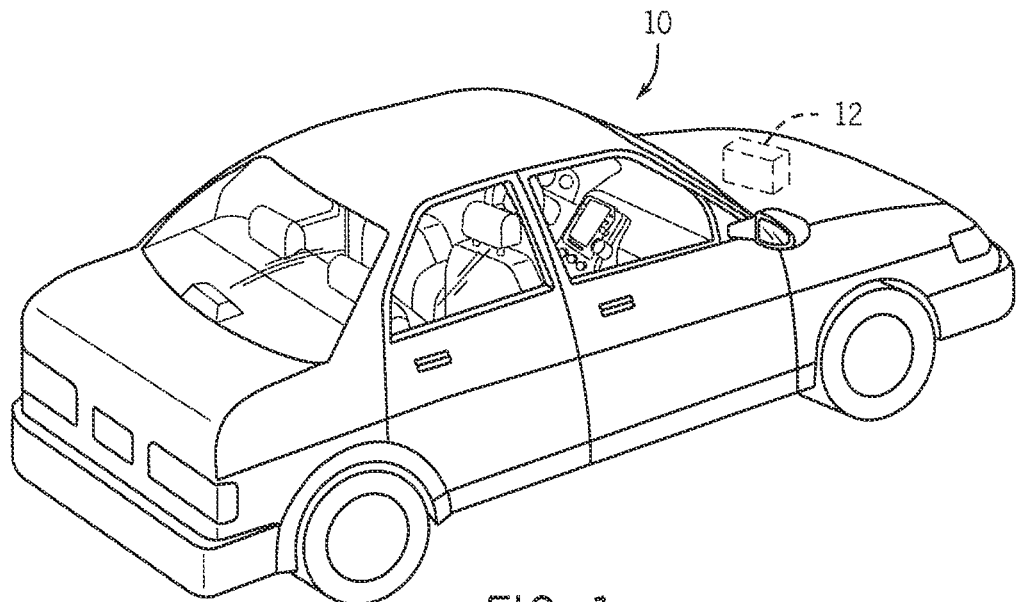
FIG. 1 is a perspective view of a vehicle having a battery system configured in accordance with present embodiments to provide power for various components of the vehicle.

To help illustrate, FIG. 1 is a perspective view of an embodiment of a vehicle 10, which may utilize a regenerative braking system. Although the following discussion is presented in relation to vehicles with regenerative braking systems, the techniques described herein are adaptable to other vehicles that capture/store electrical energy with a battery, which may include electric-powered and gas-powered vehicles.

As discussed above, it would be desirable for a battery system 12 to be largely compatible with traditional vehicle designs. Accordingly, the battery system 12 may be placed in a location in the vehicle 10 that would have housed a traditional battery system. For example, as illustrated, the vehicle 10 may include the battery system 12 positioned similarly to a lead-acid battery of a typical combustion-engine vehicle (e.g., under the hood of the vehicle 10). Furthermore, as will be described in more detail below, the battery system 12 may be positioned to facilitate managing temperature of the battery system 12. For example, in some embodiments, positioning a battery system 12 under the hood of the vehicle 10 may enable an air duct to channel airflow over the battery system 12 and cool the battery system 12.

Figure 2:
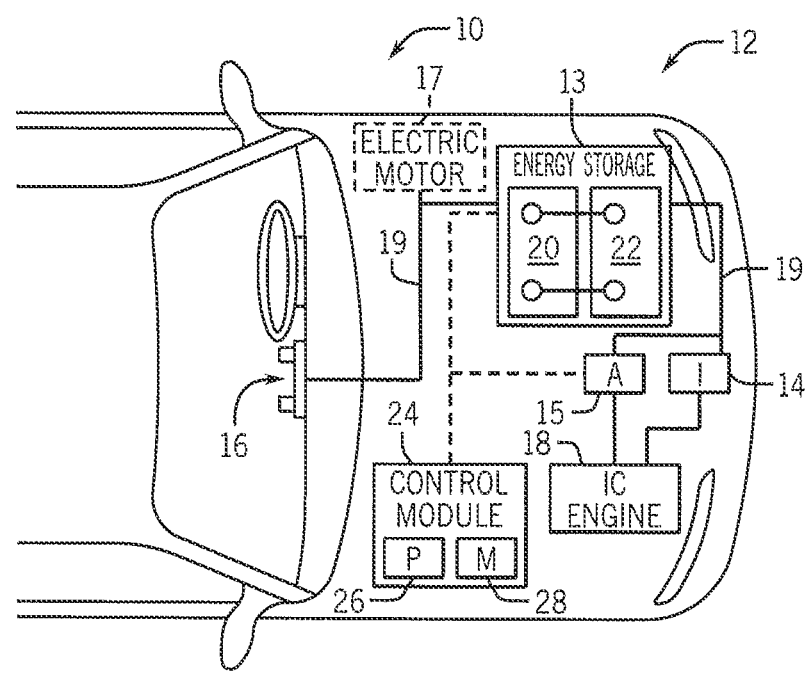
FIG. 2 is a cutaway schematic view of an embodiment of the vehicle and the battery system of FIG. 1.

A more detailed view of the battery system 12 is described in FIG. 2. As depicted, the battery system 12 includes an energy storage component 13 coupled to an ignition system 14, an alternator 15, a vehicle console 16, and optionally to an electric motor 17. Generally, the energy storage component 13 may capture/store electrical energy generated in the vehicle 10 and output electrical energy to power electrical devices in the vehicle 10.

In other words, the battery system 12 may supply power to components of the vehicle's electrical system, which may include radiator cooling fans, climate control systems, electric power steering systems, active suspension systems, auto park systems, electric oil pumps, electric super/turbochargers, electric water pumps, heated windscreen/defrosters, window lift motors, vanity lights, tire pressure monitoring systems, sunroof motor controls, power seats, alarm systems, infotainment systems, navigation features, lane departure warning systems, electric parking brakes, external lights, or any combination thereof. Illustratively, in the depicted embodiment, the energy storage component 13 supplies power to the vehicle console 16 and the ignition system 14, which may be used to start (e.g., crank) the internal combustion engine 18.

Additionally, the energy storage component 13 may capture electrical energy generated by the alternator 15 and/or the electric motor 17. In some embodiments, the alternator 15 may generate electrical energy while the internal combustion engine 18 is running. More specifically, the alternator 15 may convert the mechanical energy produced by the rotation of the internal combustion engine 18 into electrical energy. Additionally or alternatively, when the vehicle 10 includes an electric motor 17, the electric motor 17 may generate electrical energy by converting mechanical energy produced by the movement of the vehicle 10 (e.g., rotation of the wheels) into electrical energy. Thus, in some embodiments, the energy storage component 13 may capture electrical energy generated by the alternator 15 and/or the electric motor 17 during regenerative braking. As such, the alternator 15 and/or the electric motor 17 are generally referred to herein as a regenerative braking system.

To facilitate capturing and supplying electric energy, the energy storage component 13 may be electrically coupled to the vehicle's electric system via a bus 19. For example, the bus 19 may enable the energy storage component 13 to receive electrical energy generated by the alternator 15 and/or the electric motor 17. Additionally, the bus 19 may enable the energy storage component 13 to output electrical energy to the ignition system 14 and/or the vehicle console 16. Accordingly, when a 12 volt battery system 12 is used, the bus 19 may carry electrical power typically between 8-18 volts.

Additionally, as depicted, the energy storage component 13 may include multiple battery modules. For example, in the depicted embodiment, the energy storage component 13 includes a lithium ion (e.g., a first) battery module 20 and a lead-acid (e.g., a second) battery module 22, which each includes one or more battery cells. In other embodiments, the energy storage component 13 may include any number of battery modules. Additionally, although the lithium ion battery module 20 and lead-acid battery module 22 are depicted adjacent to one another, they may be positioned in different areas around the vehicle. For example, the lead-acid battery module 22 may be positioned in or about the interior of the vehicle 10 while the lithium ion battery module 20 may be positioned under the hood of the vehicle 10.

In some embodiments, the energy storage component 13 may include multiple battery modules to utilize multiple different battery chemistries. For example, when the lithium ion battery module 20 is used, performance of the battery system 12 may be improved since the lithium ion battery chemistry generally has a higher coulombic efficiency and/or a higher power charge acceptance rate (e.g., higher maximum charge current or charge voltage) than the lead-acid battery chemistry. As such, the capture, storage, and/or distribution efficiency of the battery system 12 may be improved.

To facilitate controlling the capturing and storing of electrical energy, the battery system 12 may additionally include a control module 24. More specifically, the control module 24 may control operations of components in the battery system 12, such as relays (e.g., switches) within energy storage component 13, the alternator 15, and/or the electric motor 17. For example, the control module 24 may regulate amount of electrical energy captured/supplied by each battery module 20 or 22 (e.g., to de-rate and re-rate the battery system 12), perform load balancing between the battery modules 20 and 22, determine a state of charge of each battery module 20 or 22, determine temperature of each battery module 20 or 22, control voltage output by the alternator 15 and/or the electric motor 17, and the like.

Accordingly, the control unit 24 may include one or more processor 26 and one or more memory 28. More specifically, the one or more processor 26 may include one or more application specific integrated circuits (ASICs), one or more field programmable gate arrays (FPGAs), one or more general purpose processors, or any combination thereof. Additionally, the one or more memory 28 may include volatile memory, such as random access memory (RAM), and/or non-volatile memory, such as read-only memory (ROM), optical drives, hard disc drives, or solid-state drives.

In some embodiments, the control unit 24 may include portions of a vehicle control unit (VCU) and/or a separate battery control module.

Figure 3:
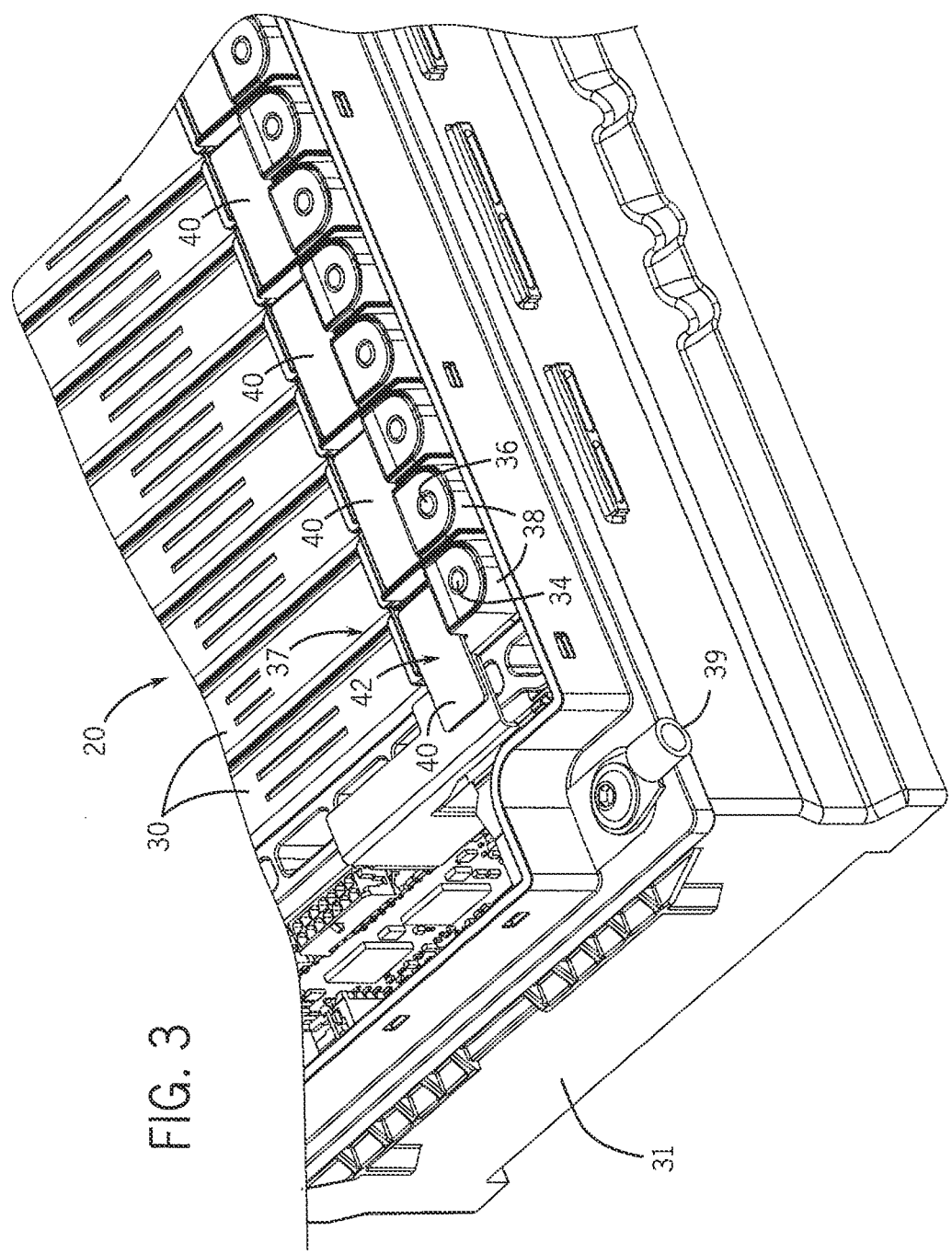
FIG. 3 is a perspective view of an embodiment of a battery module for use in the vehicle of FIG. 1, having a bus bar connection assembly in accordance with an aspect of the present disclosure.

An embodiment of the battery module 20 is shown in a perspective view in FIG. 3. In the illustrated embodiment, the battery module 20 includes a number of individual prismatic electrochemical cells 30 (e.g., Li-ion electrochemical cells 30) housed in a housing 31, each electrochemical cell 30 having a positive terminal 34 and a negative terminal 36. The prismatic electrochemical cells 30 generally include terminal ends having the terminals 34, 36, base ends opposite the terminal ends, broad faces extending between the terminal and base ends, and narrow faces extending between the broad faces. In the illustrated embodiment, a first terminal (e.g., the positive terminal 34) of a first electrochemical cell is positioned proximate a second terminal (e.g., the negative terminal 36) of a second electrochemical cell. In this regard, depending on the embodiment, the electrochemical cells 30 may be coupled together in series (e.g., positive terminal 34 to negative terminal 36, as shown) or in parallel (e.g., positive terminal 34 to positive terminal 34 or negative terminal 36 to negative terminal 36). In some embodiments, the battery module 20 may include some electrochemical cells 30 coupled together in parallel and some electrochemical cells 30 coupled together in series. To couple two adjacent electrochemical cells 30 in series, an electrical path is provided between the positive terminal 34 of a first of the two adjacent electrochemical cells 30 and the negative terminal 36 of a second of the two adjacent electrochemical cells 30. To couple two adjacent electrochemical cells 30 in parallel, an electrical path is provided between, for example, the positive terminal 34 of a first of the two adjacent electrochemical cells 30 and the positive terminal 34 of a second of the two adjacent electrochemical cells 30. Alternatively, two adjacent electrochemical cells 30 may also be coupled together in parallel by providing an electrical path between their respective negative terminals 36 as opposed to between their respective positive terminals 34.

It should be noted that the labeled positive terminal 34 in the illustrated embodiment is also electrically coupled to an external terminal 39 (e.g., an external positive terminal) of the battery module 20, where the external terminal 39 is configured to be coupled to, for example, one or more loads. In general, connections between the electrochemical cells 30 are replicated between all the terminals 34, 36 of all the electrochemical cells 30 of the battery module 20 to form an aggregate electrical network of connections. A negative terminal 36 on the other side of the battery module 20 (e.g., on the other side of the aggregate electrical network) opposite to the illustrated external terminal 39 may be coupled to another external terminal 39 (e.g., a negative external terminal). The two external terminals 39 may be coupled to the one or more loads such that the aggregate network of connections of the electrochemical cells 30 may enable a charge to be provided from the battery module 20 to the one or more loads. In this manner, each terminal 34, 36 on the exterior of each electrochemical cell 30 represents an electrical contact to the aggregated network of connections of the battery module 20.

In the illustrated embodiment, the electrochemical cells 30 are coupled together in series in accordance with the description above. For example, each electrochemical cell 30 includes a positive terminal 34 coupled to the negative terminal 36 of an adjacent cell 30 and a negative terminal 36 coupled to the positive terminal 34 of the other adjacent cell 30. The electrochemical cells 30 may be disposed in one or more rows such that the electrochemical cells 30 on either end of a row are adjacent to only one electrochemical cell 30. Accordingly, the cells 30 on either end of the row include one terminal coupled to, e.g., major terminals (not shown) of the battery module 20 configured to couple the battery module 20 to a load (e.g., of the xEV 10 or another load).

To couple terminals 34, 36 of adjacent electrochemical cells 30 in the illustrated embodiment, an electrical path is provided between the terminals 34, 36 via a bus bar connection assembly 37 in accordance with the present disclosure. The bus bar connection assembly 37, for example, is configured to provide the electrical path between the respective first terminal 34 (e.g., a positive terminal) of a first one of the electrochemical cells 30 and the respective second terminal 36 (e.g., a negative terminal) of a second one of the electrochemical cells 30. However, it should be noted that the disclosed bus bar connection assembly 37 may be used to couple (e.g., provide an electrical path between) two positive terminals or two negative terminals in a parallel connection, or a positive terminal and a negative terminal in a series connection (as shown). Further, the bus bar connection assembly 37, as described in detail below, may be used to couple terminals 34, 36 having the same or two different materials.

The bus bar connection assembly 37, in the illustrated embodiment, includes adapters 38 configured to fit over the terminals 34, 36 of the adjacent electrochemical cells 30. The adapters 38 each include at least a conductive portion (e.g., a metallic portion) configured to contact the terminals 34, 36 of the electrochemical cells 30, which are also conductive (e.g., metallic), to establish an electrical path between the terminals 34, 36. Thus, each electrochemical cell 30 is electrically coupled to the adapters 38 that fit around its respective terminals 34, 36. To electrically couple two adjacent adapters 38 (e.g., the first adapter 38 over the first terminal 34 of the first electrochemical cell 30 and the second adapter 38 over the second terminal 36 of the adjacent second electrochemical cell 30), a bus bar 40 (e.g., a metallic, bi-metallic, alloyed, or otherwise conductive bus bar) is disposed in recesses 42 of the two adjacent adapters 38.

Also included on each adapter 38 in the illustrated embodiment is electrically insulative material configured to block potential short circuits. For example, each adapter 38 in the illustrated embodiment includes a plastic or otherwise electrically insulative material (e.g., dielectric material) disposed around the metallic portion of the adapter 38. For the purpose of the present disclosure, an "electrically insulative material" includes materials that do not substantially transmit electric current therethrough. The electrically insulative material may extend upwardly proximate the recess 42 of the adapter 38 and the conductive bus bar 40 disposed in the recess. Accordingly, the electrical path provided between the two terminals 34, 36 of the adjacent electrochemical cells 30 is protected by the electrically insulative material.

As described above, the adapters 38 may, depending on the embodiment, be configured to enable coupling of certain electrochemical cells 30 of the battery module 20 in series, in parallel, or in a combination thereof. Indeed, presently contemplated embodiments of the adapters 38 are capable of coupling terminals having the same material, or terminals having two different materials. For example, perspective views of embodiments of the bus bar connection assembly 37 having adapters 38 configured to couple together terminals having various materials are shown in FIGS. 4-6.

Focusing first on the embodiment of the bus bar connection assembly 37 shown in FIG. 4, the illustrated adapters 38 are configured to couple the first terminal 34, having a first conductive material, with the adjacent second terminal 36, having a second conductive material different than the first conductive material. For example, the first terminal 34 may be aluminum and the second terminal 36 may be copper. As will be appreciated by those of skill in the art, an electrochemical half-reaction occurs at each of the positive and negative electrodes. For example, the electrochemical half-reaction at the positive electrode may be a reaction in which one or more lithium ions are reversibly (based on an equilibrium) dissociated from the positive electrode active material, thereby also releasing one or more electrons (equal in number to the number of dissociated lithium ions). At the negative electrode, the electrochemical half-reaction that occurs may be a reaction in which one or more lithium ions and one or more electrons (of equal number) are reversibly associated with the negative electrode active material (e.g., carbon). During discharging of the battery, the equilibria at the electrodes favor dissociation of the lithium ions and electrons from the negative electrode active material and re-association of the electrons and lithium ions with the positive electrode active material. On the other hand, during charging, the reverse is true. The movement of the ions into the electrodes is commonly referred to as intercalation or insertion, and the movement of the ions away from the electrodes is commonly referred to as deintercalation or extraction. Accordingly, during discharging, intercalation occurs at the positive electrode and deintercalation occurs at the negative electrode, and during charging, the reverse is true. Therefore, the positive and negative electrodes of the present batteries will generally be capable of lithium ion intercalation and deintercalation. As will also be appreciated, the particular materials selected for a current collector for each of the positive and negative electrodes will also depend on the particular materials used as their respective active materials. For instance, in for a cathode with NMC active material, the current collector (e.g. the first terminal 34) may be aluminum, while for an anode with graphite active material, the current collector (e.g., the second terminal 36) may be copper.

As previously described, in accordance with present embodiments, the electrical path between the two terminals 34, 36 is generally established via adapters 38. The adapter 38 that fits over (or around) the first terminal 34, in the illustrated embodiment, may also include aluminum. In particular, a conductive portion 50 (e.g., metallic portion) of the adapter 38 is aluminum (e.g., the same conductive material as the terminal 34). The adapter 38 that fits over (or around) the second terminal 36, in the illustrated embodiment, may include a bi-material (e.g., bi-metallic) conductive portion 52. The conductive and bi-material conductive portions 50, 52 may include any conductive material(s), but, for simplicity, may be referred to as metallic and bi-metallic portions 50, 52 herein. The bi-metallic portion 52 includes a first portion 54 (e.g., having the same material as the second terminal 36, copper) that contacts the second terminal 36. The first portion 54 transitions to a second portion 56 (e.g., aluminum, the same material as the first terminal 34) proximate to the recess 42 of the adapter 38. Thus, each recess 42 (e.g., recessed portion) of the two adjacent adapters 38 includes the same material (e.g., aluminum). The conductive bus bar 40 also includes, for example, aluminum to correspond with aluminum in the recessed portions 42 in each of the adapters 38. Accordingly, the first portion 54 of the bi-metallic portion 52 of the adapter 38 that corresponds with the illustrated copper terminal 36 is configured to transition (e.g., from the first portion 54 to the second portion 56) to a material, in the second portion 56, that corresponds with the conductive bus bar 40.

It should be noted that, in the embodiments illustrated in FIGS. 4-6, the electrochemical cells 30 may be coupled together in series or in parallel, as previously described. For example, depending on the electrochemically-active materials (e.g., anode and cathode active material) of the electrochemical cell 30, the electrochemical cell 30 may include two copper terminals 34, 36, two aluminum terminals 34, 36, one copper terminal 36/34 and one aluminum terminal 34/36, or two terminals 34, 36 having the same or different other materials. In general, the internal chemistry, among other factors, determines the type of material used for each terminal 34, 36 (e.g., of the anode and cathode). Accordingly, depending on the embodiment, two terminals 34, 36 having the same material may be electrically coupled to couple cells in series or in parallel, and two terminals 34, 36 having different materials may be electrically coupled to couple cells in series or in parallel. In this regard, battery modules in accordance with the present disclosure may include multiple types of adapters and/or bus bars.

As described above, the adapters 38 may include an electrically insulative portion 58 configured to block external, loose, or proximate materials or parts from contacting the conductive portions 50, 52 of the adapters 38, which could otherwise cause a potential short circuit. The electrically insulative portion 58 (e.g., having plastic) may surround, for example, outer sides of the adapter 38. The plastic portion 58 may also include a wall 60 that extends upwardly from the adapter 38 (e.g., in a direction parallel to the terminals 34, 36 extending upwardly from the cells 30) proximate the recess 42 of the adapter 38. The wall 60 may partially define the recess 42 or recessed portion configured to receive the bus bar 40 and may be disposed proximate a far side 62 of the bus bar 40 and recessed portion 42 of the adapter 38. It should be noted that, regardless of whether metal or bi-metal portions 50, 52 are used, the adapters 38 may include the same or similar plastic portions 58 and corresponding walls 60 to block or reduce a likelihood of a short circuit, as described above. The illustrated embodiments and corresponding description are not included to be limited to the combination of elements shown. Rather, the disclosed elements of the bus bar connection assembly 37 may be used in various combinations as appropriate for electrochemical cells 30 coupled in series, coupled in parallel, having terminals 34, 36 with corresponding materials, or having terminals 34, 36 with different materials.

As previously indicated, certain embodiments of the battery module 20 may include a bus bar connection assembly 37 configured to couple together terminals 34, 36 having the same conductive material. For example, in FIG. 5, adjacent first and second terminals 34, 36 (e.g., both extending from an anode) having, for example, copper as their conductive material are shown electrically coupled via an embodiment of the bus bar connection assembly 37. In the illustrated embodiment, each terminal 34, 36 has an embodiment of the adapter 38 having the bi-metallic portion 52 described above. For example, the terminals 34, 36 may be copper and the bi-metallic portion 52 of each adapter 38 may include the first (e.g., copper) portion 54 proximate (e.g., contacting) the terminal 34, 36 and the second (e.g., aluminum) portion 56 proximate the recess 42 (e.g., recessed portion) of the adapter 38. Thus, an aluminum embodiment of the conductive bus bar 40 fits within the recesses 42 of both adapters 38 and contacts the aluminum portions 56 of both adapters 38, electrically coupling the two terminals 34, 36.

Alternatively, certain embodiments of the battery module 20 may include a bus bar connection assembly 37 configured to couple two adjacent terminals together, where the adapters 38 only include a single conductive material (e.g., do not include the bi-metallic portion 52 shown in FIGS. 4 and 5). For example, in FIG. 6, an embodiment of the bus bar connection assembly 37 is shown having two adapters 38 with corresponding metallic portions 50 having aluminum. The terminals 34, 36 (e.g., both extending from a cathode) are aluminum and the metallic portion 50 of each adapter 38 is also aluminum. An aluminum conductive bus bar 40 is configured to provide the electrical path between the adapters 38, where the bus bar 40 is disposed within (and spans between) the two recessed portions 42 of the adjacent adapters 38.

Figure 7:
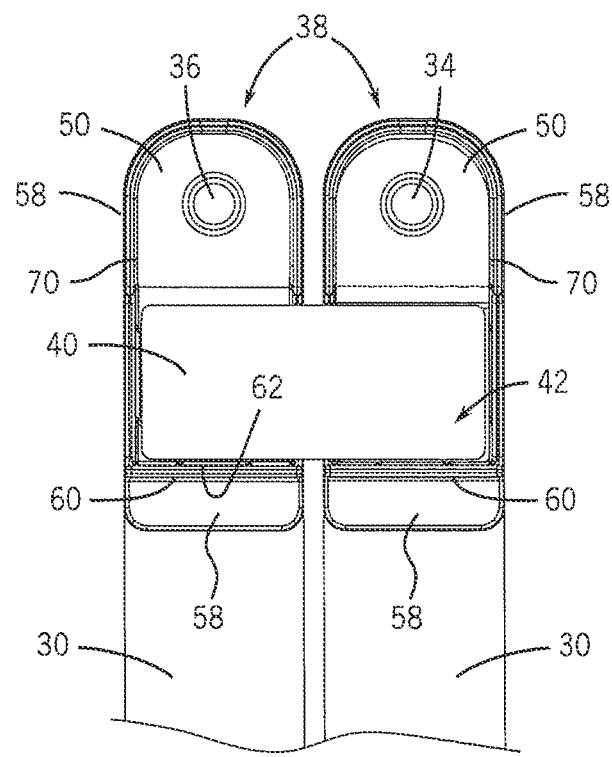
FIG. 7 is a top view of a portion of the bus bar connection assembly of FIG. 3, in accordance with an aspect of the present disclosure.

As described above, the bus bar 40 is configured to be disposed within, and span between, the two recesses 42 of the adjacent adapters 38. For example, a top view of an embodiment of the bus bar connection assembly 37 having the bus bar 40 spanning between two recesses 42 of adjacent adapters 38 is shown in FIG. 7. In the illustrated embodiment, as previously described, the bus bar 40, and the metallic (or otherwise conductive) portions 50 of the adapters 38 (e.g., the electrical path) is at least partially protected from a short circuit via the plastic (or otherwise electrically insulative) portions 58 of the adapters 38. For example, the plastic portions 58 substantially surround outer surfaces or edges 70 of the adapters 38. Additionally, the plastic portions 58 include walls 60 that extend upwardly from the adapters 38 proximate the far side or far edge 62 of the bus bar 40 (or recesses 42). The walls 60 are configured to provide additional protection from a short circuit, but may also be configured to guide placement and securement (e.g., via welding, adhesive) of the bus bar 40 into the recesses 42 of the adjacent adapters 38. It should be noted that the plastic portions 58 and corresponding walls 60 may not cover a top portion of the metallic portions 50 (or bi-metallic portions 52) of the adapters 38, such that the bus bar 40 may be placed into the recesses 42 and accessed from above the electrochemical cells 30 for securing the bus bar 40 (e.g., via welding, adhesive) to the adapters 38. However, generally, the recesses 42 of the adapters 38 and the plastic portions 58 (and corresponding walls 60) surrounding the metallic/bi-metallic portions 50, 52 of the adapters 38 are configured to protect the electrical path between the two terminals 34, 36 from being contacted by other components.

The recesses 42 also increase the energy density of the battery module 20. For instance, by disposing the bus bars 40 within the recesses 42 of the adapters 38, the bus bars 40 are disposed in-line (e.g., in plane) with (or below) the terminals 34, 36, instead of on top of (and above) the terminals 34, 36. Thus, a height of the battery module 20 may be reduced compared to battery modules having bus bars disposed on top of and above the terminals 34, 36, thereby comparatively reducing the volume and increasing the energy density of the battery module 20. Further, in some embodiments, each electrochemical cell 30 of the battery module 20 may include slightly different widths (e.g., within manufacturing tolerances). Since the bus bar 40 sits within recesses 42 of the adapters 38 (e.g., as opposed to being rigidly connected between the terminals 34, 36 of the electrochemical cells 30), the electrochemical cells 30 (and adapters 38 thereof) may be positioned immediately adjacent one another before coupling the bus bar 40 to the recessed portions 42. Thus, in accordance with the present disclosure, space is saved between the electrochemical cells 30 and an energy density of the battery module 20 is increased.

Figure 8:
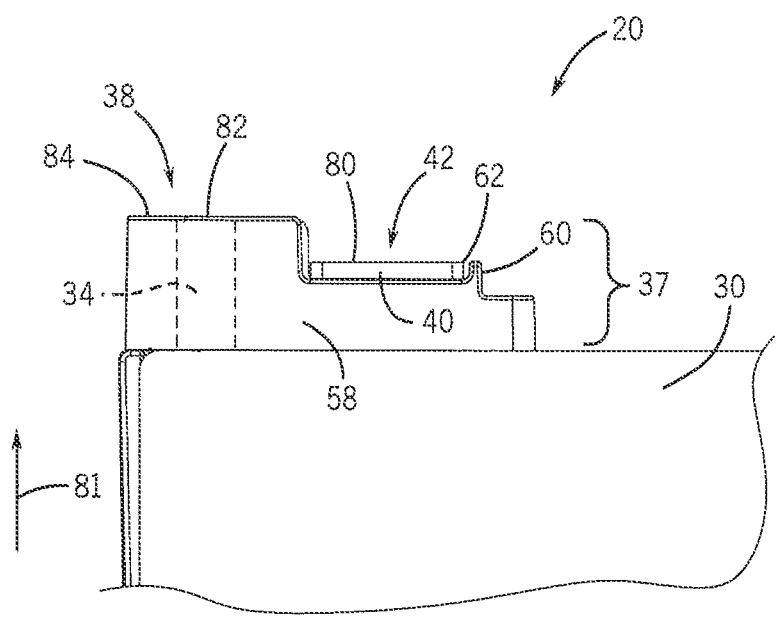
FIG. 8 is a side view of a portion of the bus bar connection assembly of FIG. 3, in accordance with an aspect of the present disclosure.

The reduced height by the present connection assembly may be further appreciated with respect to FIG. 8, which depicts a side view of an embodiment of one electrochemical cell 30 having the adapter 38 with the bus bar 40 disposed in the recess 42 of the adapter 38. In the illustrated embodiment, a top surface 80 of the bus bar 40 is disposed below a top surface 82 of the terminal 34 with respect to vertical axis 81. The top surface 82 of the terminal 34, in the illustrated embodiment, is flush (e.g., in-line or in-plane) with a top surface 84 of the adapter 38. Accordingly, all components of the bus bar connection assembly 37 are disposed in-line with and/or below the top surface 82 of the terminal 34 (with respect to the vertical axis 81), thereby reducing a clearance of the illustrated electrochemical cell 30 compared to other arrangements where terminals are fitted directly (and/or rigidly) with a bus bar. The reduced clearance reduces a height and, thus, a volume of the battery module 20, thereby increasing the energy density of the battery module 20.

To facilitate efficient assembly and/or manufacturing of the battery module 20 and the bus bar assembly 37 in particular, the adapters 38 (or portions of the adapters 38) may be included (e.g., disposed on or integrally formed with) on a board (e.g., a panel, an e-carrier configured to hold certain portions of the bus bar assembly 37 and/or other sensors or circuitry and to fit over the electrochemical cells 30, a printed circuit board (PCB), or some other board) configured to fit over all (or some) of the electrochemical cells 30 of the battery module 20. For example, FIGS. 9-11 show embodiments of the bus bar assembly 37 having adapters 38 disposed on a board 90 (e.g., an e-carrier) configured to be disposed over all or some of the electrochemical cells 30 of the battery module 20 (e.g., longitudinally between tops of the electrochemical cells 30 (e.g., tops having the terminals 34, 36 extending therefrom) and the adapters 38).

Figure 9:
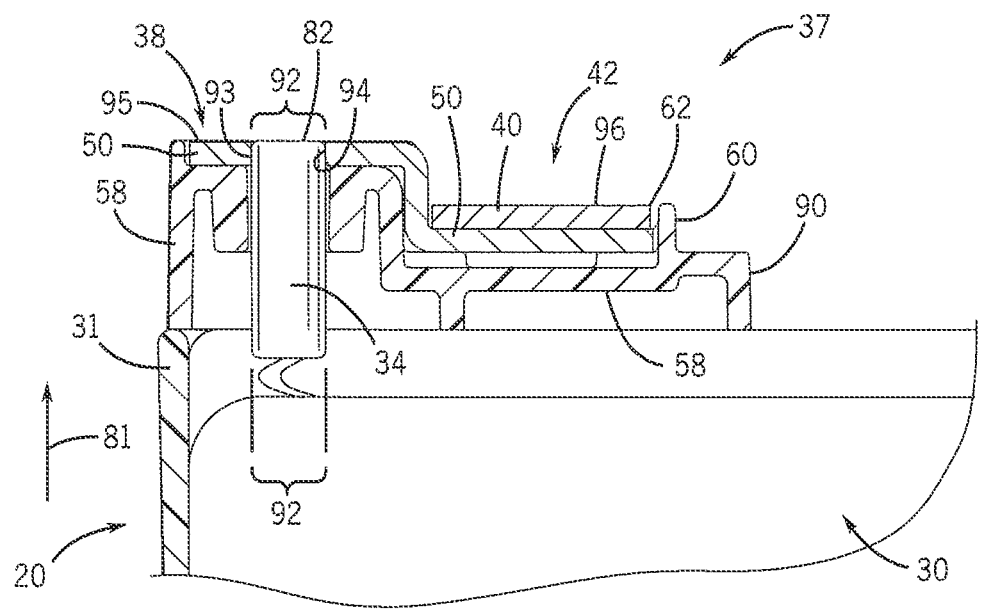
FIG. 9 is a cross-sectional side view of a battery module, e-carrier, and bus bar connection assembly, in accordance with an aspect of the present disclosure.

Focusing first on FIG. 9, a cross-sectional side view of one electrochemical cell 30 of the battery module 20 having the corresponding adapter 38 disposed on the board 90 is shown. In the illustrated embodiment, the plastic (or otherwise electrically insulative) portion 58 of the illustrated adapter 38 is integrally formed with the board 90 (which includes the plastic portions 58 of all the other adapters 38), in which the board 90 is configured to be disposed over all the electrochemical cells 30 of the battery module 20. For example, the board 90 includes multiple openings 92 through which the terminals 34, 36 of the electrochemical cells 30 extend. Indeed, the openings 92 extend through the plastic portions 58 and the metallic (or otherwise electrically conductive) portions 50 of the adapters 38 also disposed on the board 90. Thus, each terminal 34, 36 extends through the plastic portion 58 and an outer surface 93 of the terminal (e.g., terminal 34 in the illustrated embodiment) contacts an inner surface 94 of the metallic portion 50 of the adapter 38.

It should be noted that the metallic portions 50 (or bi-metallic portions 52, depending on the embodiment) of the adapters 38 may be disposed in the plastic portions 58 integrally formed with the board 90 before or after disposing the board 90 over the electrochemical cells 30. Further, the bus bar 40 may be disposed in the recesses 42 of the adapters 38 before or after disposing the board 90 over the electrochemical cells 30 and disposing the metallic portions 50 (or bi-metallic portions 52) into the plastic portions 58. For example, in some embodiments, the metallic portions 50 (or bi-metallic portions 52) of the adapters 38 may be disposed in the plastic portions 58 of the board 90 and the bus bars 40 may be disposed within (and spanning between) the recesses 42 of the adapters 38 before disposing the board 90 over the electrochemical cells 30. In doing so, assembly of the battery module 20 may be made more efficient and all the electrical paths between the terminals 34, 36 of the electrochemical cells 30 of the entire battery module 20 (or a portion thereof) may be established substantially simultaneously.

However, in other embodiments, the board 90 having the plastic portions 58 integrally formed on the board 90 may be disposed over the electrochemical cells 30 before the metallic portions 50 (or bi-metallic portions 52) of the adapters 38 are disposed within the plastic portions 58 and before the bus bars 40 are disposed in the recesses 42 of the adapters 38. In either configuration, the board 90 facilitates a more efficient assembly of the bus bar connection assembly 37 and the battery module 20 in general. As previously described, in either configuration, the assembled bus bar connection assembly 37 reduces an overall clearance of the battery module 20, as a top surface 95 of the adapter 38 is in plane with (or, in other embodiments, below) the top surface 82 of the terminal 34 (or terminal 36) and a top surface 96 of the bus bar 40 is below (or, in some embodiments, in plane with) the top surface 82 of the terminal 34 (or terminal 36). Also, the board 90 (e.g., e-carrier) does not protrude beyond the terminals 34, 36, unlike other arrangements.

To further facilitate efficient and accurate assembly of the battery module, the openings 92 of the adapters 38 configured to receive the terminals 34, 36 of the electrochemical cells 30 may be tapered. For example, an embodiment of one electrochemical cell 30 (e.g., of the battery module 20) having the adapter 38 with a tapered opening 98 is shown in a cross-sectional side view in FIG. 10. In the illustrated embodiment, the tapered opening 98 extends through the plastic portion 58 and the metallic portion 50 (or bi-metallic portion 52, depending on the embodiment). It should be noted, however, that the tapered opening 98 may only be tapered for a portion of the opening 98 through which the terminal (e.g., parallel with the vertical axis 81) extends. For example, in some embodiments, only the plastic portion 58 is tapered and the metallic portion 50 is substantially non-tapered (e.g., the inner surface 94 of the metallic portion 50 is parallel with the outer surface 93 of the terminal 34). However, in some embodiments, the portion of the opening 98 extending through the metallic portion 50 of the adapter 38 is also tapered. Thus, the terminal 34 may more readily contact the inner surface 94 of the metallic portion 50. Conversely, the terminal 34 may also be tapered.

It should be noted that, in some embodiments of the bus bar connection assembly 37 having the board 90, the board 90 may not include any portions of the adapters 38 integrally formed on the board 90. For example, the adapters 38 may be pre-assembled or partially pre-assembled (e.g., separately) and coupled to the board 90 (which may have a substantially flat top surface 100) via welding, adhesive, fasteners, clamps, clips, press fitting, or some other coupling mechanism after pre-assembly. A portion of an embodiment of the battery module 20 having the bus bar connection assembly 37 (e.g., the adapters 38 and bus bars 40) disposed on a board 90 (and not integrally formed with the board 90), where the board includes the flat top surface 100, is shown in an exploded perspective view in FIG. 11.

In the illustrated embodiment, pre-assembled or partially pre-assembled adapters 38 (e.g., having the plastic portions 58, the metallic and/or bi-metallic portions 50, 52, and/or the bus bars 40) are attached to the board 90 via adhesive, fasteners, welding, clamps, clips, press fitting, or any other appropriate coupling technique. For example, the adapters 38 may be separately assembled (e.g., with the metallic or bi-metallic portions 50, 52 disposed in the plastic portions 58) and placed onto the board 90 before or after the board 90 is placed over the terminals 34, 36 of the electrochemical cells 30. The board 90 and the adapters 38 have the openings 92 configured to be aligned during assembly to receive the terminals 34, 36 of the electrochemical cells 30. In certain embodiments, the bus bars 40 may be disposed into the recesses 42 of the adapters 38 before or after disposing the adapters 38 on the board 90 and/or before or after disposing the board 90 over the terminals 34, 36. Further, as previously described, the electrochemical cells 30 are coupled together at the terminals 34, 36 and one terminal 34, 36 on either end of the arranged row or stack of cells 30 may be coupled to external terminals 39 of the battery module 20, where the external terminals 39 may be coupled to one or more loads.

Further still, it should be noted that the bus bar connection assembly 37 having the board 90 may be manufactured and assembled in a number of different ways. For example, as previously described, the adapters 38 may be entirely pre-assembled before disposing the adapters 38 on the board 90. The metallic portions 50 (and/or bi-metallic portions 52) may be disposed into the plastic portions 58 of the adapters and the bus bars 40 may be disposed into the recesses 42 of the adapters 38 to assemble the adapters 38. Indeed, the bus bars 40 may be welded or otherwise coupled to the metallic portions 50 (or bi-metallic portions 52) of the two adjacent adapters 38, as previously described, during or after pre-assembly of the adapters 38.

A process flow diagram of a method 110 of establishing an electrical connection or path between terminals 34, 36 of two electrochemical cells 30 is shown in FIG. 12. In the illustrated embodiment, the method 110 includes disposing a first adapter 38 over a first terminal 34 of a first electrochemical cell 30, where a first electrically conductive (e.g., metallic) portion 50 of the first adapter 38 contacts the first terminal 34 (block 112). The method 110 also includes disposing a second adapter 38 over a second terminal 36 of a second electrochemical cell 30, where a second electrically conductive (e.g., metallic) portion 50 of the second adapter 38 contacts the second terminal 36 (block 114). Further, the method 110 includes disposing a bus bar 40 in a first recess 42 of the first metallic portion 50 of the first adapter 38 and a second recess 40 of the second metallic portion 50 of the second adapter 38, thereby establishing an electrical path from the first terminal 34, to the first metallic portion 50, to the bus bar 40, to the second metallic portion 50, and to the second terminal 36 (block 116). The element numbers and resulting structure of the above described method 100 generally corresponds with the embodiment of the bus bar connection assembly 37 illustrated in FIG. 6. Similar methods apply to any of the structural embodiments previously discussed with reference to the figures.

One or more of the disclosed embodiments, alone or in combination, may provide one or more technical effects useful in the manufacture of battery modules, and portions of battery modules. In general, embodiments of the present disclosure include a battery module with a bus bar connection assembly configured to couple terminals of adjacent electrochemical cells in a way that reduces a volume of the battery module, thereby enhancing the energy density of the battery module. For example, the bus bar connection assembly includes adapters configured to fit over or terminals of adjacent electrochemical cells, where the adapters include recessed portions configured to be aligned together to receive a bus bar. The bus bar spans between the recessed portion of the adjacent adapters of the adjacent electrochemical cells, contacting the metallic portions of both adapters. Thus, an electrical path is established between the adjacent terminals, while top surfaces of the terminals are disposed above any other surface of components of the bus bar connection assembly (e.g., the adapters and the bus bars). Further, by disposing the bus bar in the adjacent recesses, and by providing a plastic portion on each of the adapters around the metallic portions and proximate the recesses, the electrical path is protected from potential short circuits occurring due to components contacting the electrical path. Also, the adapters can be used to mitigate differences in dimensions, sizes, etc., as previously discussed, and also provides a more robust connection. The technical effects and technical problems in the specification are exemplary and are not limiting. It should be noted that the embodiments described in the specification may have other technical effects and can solve other technical problems.

While only certain features and embodiments have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the disclosed subject matter. The order or sequence of any process or method steps may be varied or re-sequenced according to alternative embodiments. Furthermore, in an effort to provide a concise description of the exemplary embodiments, all features of an actual implementation may not have been described. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A battery module, comprising:
a first electrochemical cell having a first terminal with a first vertical axis;
a second electrochemical cell having a second terminal with a second vertical axis; and
a bus bar connection electrically connecting the first and second electrochemical cells, wherein the bus bar connection comprises a first adapter corresponding with the first terminal of the first electrochemical cell, a second adapter corresponding with the second terminal of the second electrochemical cell, and a bus bar spanning between the first adapter and the second adapter, each of the first and second adapters comprising:
a first portion configured to receive the corresponding first or second terminal;
a second portion adjacent to the first portion with respect to a direction extending perpendicular to the first or second vertical axis of the corresponding first or second terminal, respectively, wherein the first portion comprises a first top adapter surface, wherein the second portion comprises a second top adapter surface, and wherein the first top adapter surface of the first portion is disposed higher than the second top adapter surface of the second portion with respect to the first or second vertical axis of the corresponding first or second terminal, respectively; and
a step extending between the first portion and the second portion transverse to the direction;
wherein the second top adapter surfaces of the second portions of the first adapter and the second adapter are aligned with each other along the direction to enable reception of the bus bar on the second top adapter surfaces of the second portions of the first adapter and the second adapter such that the bus bar is offset from, and does not intersect, the first vertical axis of the first terminal and the second vertical axis of the second terminal, thereby establishing an electrical path between the first terminal and the second terminal.

2. The battery module of claim 1, wherein the first adapter comprises a first conductive component in contact with the first terminal and forming at least part of the first and second portions of the first adapter, the second adapter comprises a second conductive component in contact with the second terminal and forming at least part of the first and second portions of the second adapter, and the bus bar is in electric contact with the first conductive component and the second conductive component to establish the electrical path.

3. The battery module of claim 2, wherein the first adapter comprises a first electrically insulative component at least partially surrounding the first conductive component of the first adapter, and wherein the second adapter comprises a second electrically insulative component at least partially surrounding the second conductive component of the second adapter.

4. The battery module of claim 3, wherein the first electrically insulative component comprises a first wall and the second electrically insulative component comprises a second wall, and wherein the bus bar is disposed between (a) the steps of the first and second adapters; and (b) the first and second walls of the first and second adapters, respectively.

5. The battery module of claim 2, wherein the first conductive component is a bi-material conductive component comprising a first conductive material and a second conductive material different than the first conductive material, wherein one of the first or second conductive materials is configured to contact the first terminal and the other of the first or second conductive materials is configured to contact the bus bar.

6. The battery module of claim 5, wherein the first conductive material is copper and the second conductive material is aluminum.

7. The battery module of claim 1, wherein the first and second electrochemical cells are lithium ion electrochemical cells.

8. The battery module of claim 1, comprising a panel extending in the direction perpendicular to the vertical axes of the first and second adapters, over the first and second electrochemical cells, and over the first and second adapters, wherein the panel comprises openings, and wherein the first and second terminals of the first and second electrochemical cells, respectively, are disposed through the openings.

9. The battery module of claim 8, wherein a first electrically insulative component of the first adapter and a second electrically insulative component of the second adapter are integrally formed with the panel, and a first conductive component and a second conductive component of the first and second adapters, respectively, are disposed within the first and second electrically insulative components, respectively, such that the bus bar disposed on the second top adapter surfaces of the first and second adapters is in contact with the first and second conductive components, thereby establishing the electrical path between the first and second terminals.

10. The battery module of claim 1, wherein the first and second electrochemical cells are prismatic electrochemical cells.

11. The battery module of claim 1, wherein the first and second electrochemical cells are stacked next to each other, the first terminal of the first electrochemical cell is coupled to an anode of the first electrochemical cell, and the second terminal of the second electrochemical cell is coupled to a cathode of the second electrochemical cell.

12. The battery module of claim 10, wherein the battery module includes pairs of first and second electrochemical cells coupled together in an aggregate network of the battery module, and wherein the aggregate network culminates in a positive terminal on a first side of the battery module and a negative terminal on a second side of the battery module.

13. The battery module of claim 1, wherein the step extends substantially parallel with the vertical axis.

14. The battery module of claim 1, wherein the first terminal comprises a first top terminal surface, wherein the second terminal comprises a second top terminal surface, and wherein the first top adapter surface and the second top adapter surface are disposed no higher than the corresponding first or second top terminal surface with respect to the vertical axis.

15. A battery module, comprising:
a plurality of prismatic electrochemical cells electrically coupled to form an aggregate electrical network; and
an adapter having a first portion receiving a terminal of a prismatic electrochemical cell of the plurality of prismatic electrochemical cells in an opening of the first portion such that a vertical axis of the terminal extends through the first portion, and a second portion disposed adjacent to the first portion along a direction extending perpendicular to the vertical axis such that the vertical axis does not extend through the second portion, wherein the first portion comprises a first top surface, wherein the second portion comprises a second top surface, wherein the first top surface of the first portion is disposed higher than the second top surface of the second portion with respect to the vertical axis of the opening, wherein the second top surface is configured to receive a bus bar such that a third top surface of the bus bar is positioned no higher than the first top surface of the adapter and such that the vertical axis does not extend through the bus bar, and wherein the adapter comprises a step extending between the first portion and the second portion transverse to the direction.

16. The battery module of claim 15, wherein the adapter comprises an electrically insulative component at least partially surrounding a conductive component of the adapter, and wherein the bus bar is in contact with the conductive component.

17. The battery module of claim 16, wherein the electrically insulative component comprises a wall, wherein the wall is disposed on a far side of the second portion of the adapter opposite to a near side of the second portion of the adapter, and wherein the near side of the second portion is disposed closer to the step of the adapter than the far side of the second portion of the adapter.

18. The battery module of claim 16, wherein the conductive component is a bi-material conductive component comprising a first conductive material and a second conductive material different than the first conductive material, wherein the first conductive material is in contact with the terminal and the second conductive material is in contact with the bus bar, and wherein the bus bar comprises the second conductive material and the terminal comprises the first conductive material.

19. The battery module of claim 15, wherein the opening in the first portion of the adapter is tapered along the vertical axis of the opening to facilitate reception of the terminal.

20. The battery module of claim 15, wherein prismatic electrochemical cells of the plurality of prismatic electrochemical cells are stacked together in a row within a housing of the battery module.

21. The battery module of claim 15, wherein the third top surface of the bus bar is positioned no higher than a fourth top surface of the terminal with respect to the vertical axis of the opening.

22. A battery system, comprising:
an adapter configured to facilitate electrical coupling of a terminal of an electrochemical cell to an adjacent electrochemical cell, comprising:
a bottom component sized and shaped to fit over the terminal of the electrochemical cell, wherein the bottom component comprises an opening through which the terminal of the electrochemical cell extends; and
a top component comprising a first portion and a recessed portion, wherein the first portion contacts the terminal such that a vertical axis of the terminal extends through the first portion, wherein the recessed portion is offset from the first portion in a direction perpendicular to the vertical axis of the terminal such that the vertical axis does not extend through the recessed portion, wherein the first portion comprises a first top surface, and wherein the recessed portion comprises a second top surface disposed below the first top surface with respect to the vertical axis of the opening; and
a bus bar disposed on the recessed portion of the top component of the adapter such that the bus bar is offset from the opening of the bottom component of the adapter in the direction perpendicular to the vertical axis, such that the vertical axis does not extend through the bus bar, and such that a third top surface of the bus bar is disposed no higher, with respect to the vertical axis, than a fourth top surface of the terminal.

23. The battery system of claim 22, wherein the top component comprises a conductive component having the first portion and the recessed portions.

24. The battery system of claim 23, wherein the bottom component of the adapter comprises an electrically insulative component configured to at least partially surround the conductive component.

25. The battery system of claim 23, wherein the first portion of the conductive component comprises a first conductive material, and wherein the recessed portion of the conductive component comprises a second conductive material different than the first conductive material.

26. The battery system of claim 22, wherein the opening is tapered from the bottom component upwardly toward the top component such that a cross-section width of the opening is reduced from the bottom component upwardly toward the top component.

27. The battery module of claim 22, wherein the first top surface, the second top surface, and the third top surface are configured to be disposed, in an installed state, no higher than a terminal top surface of the terminal of the electrochemical cell.

* * * * *

UNITED STATES PATENT AND TRADEMARK OFFICE
CERTIFICATE OF CORRECTION

PATENT NO. : 9,887,409 B2  
APPLICATION NO. : 14/502485  
DATED : February 6, 2018  
INVENTOR(S) : Richard M. DeKeuster et al.

Page 1 of 1

It is certified that error appears in the above-identified patent and that said Letters Patent is hereby corrected as shown below:

On the Title Page

Item (56), under "OTHER PUBLICATIONS", please delete "Internationai" and insert -- International --.

In the Specification

In Column 3, Line 19, please delete "DRAWINGS" and insert -- BRIEF DESCRIPTION OF THE DRAWINGS --.

In Column 3, Line 53, please delete "disclosure; and" and insert -- disclosure; --.

In Column 14, Line 47, please delete "second recess 40" and insert -- second recess 42 --.

In Column 14, Line 52, please delete "method 100" and insert -- method 110 --.

In the Claims

In Column 18, Line 62, in Claim 27, please delete "The battery module of" and insert -- The battery system of --.

Signed and Sealed this  
Fifth Day of June, 2018

Andrei Iancu  
*Director of the United States Patent and Trademark Office*